Figure 1:
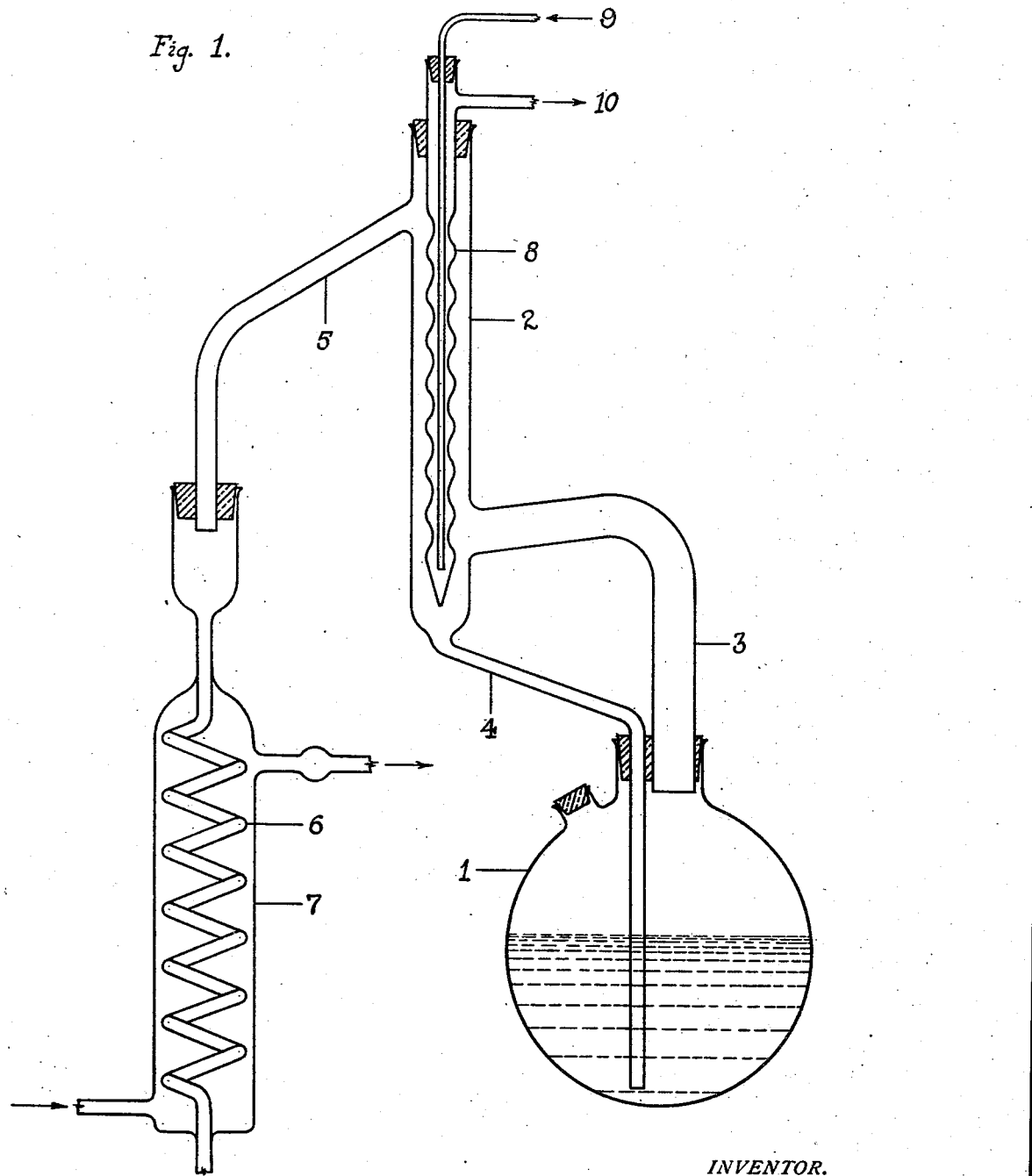

Aug. 9, 1932.   F. WALKER   1,871,019
PROCESS FOR CONCENTRATING FORMALDEHYDE SOLUTIONS
Filed March 26, 1930

INVENTOR.
Frederic Walker
BY
J. S. Wooster
ATTORNEY

Patented Aug. 9, 1932

1,871,019

UNITED STATES PATENT OFFICE

FREDERIC WALKER, OF NEW BRIGHTON, STATEN ISLAND, NEW YORK, ASSIGNOR, BY MESNE ASSIGNMENTS, TO THE ROESSLER & HASSLACHER CHEMICAL COMPANY, A CORPORATION OF DELAWARE

PROCESS FOR CONCENTRATING FORMALDEHYDE SOLUTIONS

Application filed March 26, 1930. Serial No. 439,013.

This invention relates to concentration of formaldehyde solutions.

The objects of this invention are to provide a process whereby dilute solutions of formaldehyde may be quickly and economically concentrated; and to provide a still head particularly adapted for carrying out the process.

The process according to this invention comprises vaporizing dilute formaldehyde solutions, condensing the major portion of said vapors, and passing the uncondensed vapors having an increased formaldehyde content to a separate condenser with as little contact as possible with the first condensate. This first condensate is preferably refluxed to the solution undergoing distillation.

According to this process, the vapors uncondensed after entering the first condensing zone are subjected to a minimum of washing or scrubbing by condensate returning to the still and more especially by hot condensate. In this respect the present process is almost diametrically opposite to the usual fractional distillation process carried out in the ordinary fractionating column wherein the vapors are bubbled through or otherwise kept in intimate contact with the returning condensate.

Contrary to the views commonly held I believe that formaldehyde and water, both in the vapor phase, exist as substantially separate entities. Furthermore, it is my opinion that formaldehyde vapor has a substantially small solubility in cold water although in contact with warm or hot water it readily forms soluble hydrates. In turn, if the warm formaldehyde solutions are cooled, complex formaldehyde-water polymers form. My method of separation reverses the steps just delineated. Formaldehyde solutions are heated and depolymerization follows; the solutions are vaporized, water vapor with some formaldehyde is condensed out and cooled as quickly as possible. The formaldehyde vapor is removed from contact, so far and as soon as possible, with all water which is not in cooled liquid form toward which the formaldehyde behaves as it were as an inert, substantial insoluble gas. I do not desire to be bound by my theory, however, as the same may involve error. It has been given to picture as exactly as my present knowledge allows the fundamental principles to be followed in practising my invention.

In the accompanying drawing, Fig. I illustrates, diagrammatically, an apparatus suited for carrying out this process. 1 indicates a still in which the dilute formaldehyde solution is vaporized. Mounted above the still is a still head comprising a vertical column 2 having a vapor inlet 3 adjacent the bottom, and communicating with the still; a return line 4 to the still 1 is provided at the bottom of the column for reflux return. The vertical column 2 is provided with a vapor outlet 5, adjacent its upper end which leads to a spiral condenser 6, within the water jacket 7.

Centrally located within the column 2 is an elongated water cooled condenser 8, provided with water inlet 9, and a water outlet 10. This condenser 8 extends below the vapor inlet 3 and accordingly, the vapors from the still immediately contact with this portion of condenser 8 as soon as they enter the still head. A considerable portion of the water and a minor portion of formaldehyde in the vapors condense at this point and return at once to the still through the return line 4. The uncondensed vapors, which now contain a higher percent of formaldehyde than the distillate direct from the still, proceed up the column away from the major portion of the condensate. As the vapors travel up the column 2, further condensation takes place to a small degree and hence the vapors come in contact with a minimum amount of condensate in the still head. Moreover, the condensate flowing down the condenser is cooled, thus minimizing reabsorption in the reflux.

The still head of the present invention does not contain any packing, glass rings or the like, adapted to increase the surface of condensed liquid presented to the vapors ascending in the column and in this respect, also contrary to some known apparatus constructed for formaldehyde distillation, the present apparatus does not employ what is generally known as a fractionating column. It has been found that the upright column of the still head in the present apparatus need be no more than 10 times the diameter of said column and would not be made as a practical proposition, more than 20 times the diameter of the column, whereas the combined length of the fractionating column and still head heretofore used to a large extent in this art, is approximately 100 times as long as the diameter thereof.

To illustrate results attainable by the process of this invention, the following specific example is given:

Example I 1500 cubic centimeters (1618 grams) of pure formaldehyde solution containing 28.1% of formaldehyde, or 455 grams, was placed in the still, the fractional condensation still head shown in the drawing being connected to the still. Distillation of the solution was begun maintaining the reflux ratio from 9.5 to 12.5 by control of rate of distillation and rate of flow of cooling water in the condenser. During the course of the run, 7 portions of concentrated formaldehyde solution were taken from the receptacle to obtain data showing the progress of the distillation at frequent intervals. The temperature of the vapor in the still was between approximately 93–95° C.

| Portion | Weight of portion | Per cent $CH_2O$ | Weight of $CH_2O$ in portion | Percent of original $CH_2O$ removed | Changes of concentrates in still | Reflux ratio |
|---|---|---|---|---|---|---|
| 1 | 112 | 53.4 | 60 | 13.1 | 28.1–26.2% | 11.8 |
| 2 | 197 | 44.7 | 88 | 32.4 | 26.2–23.4 | 10.6 |
| 3 | 209 | 46.3 | 97 | 53.6 | 23.4–19.1 | 12.5 |
| 4 | 208 | 40.3 | 84 | 72.0 | 19.1–14.1 | 12.2 |
| 5 | 161 | 31.0 | 50 | 83.0 | 14.1–10.4 | 9.5 |
| 6 | 197 | 24.6 | 48 | 93.6 | 10.4– 5.2 | 10.7 |
| 7 | 178 | 13.8 | 25 | 99.0 | 5.2– 2.1 | 11.6 |
| Still residue | 320 | 3.0 | 10 | 101.1 | | |

By taking portions 1, 2, 3, 4, and 5, of the above table and 150 gms. of portion 6, a 40% formaldehyde solution would be obtained containing 91.4% of the formaldehyde of the original still charge.

Although the process of my invention has been described with reference to only one form of apparatus, it is evident that a wide variation in the design and materials composing the apparatus is possible without departing from the scope of my invention. I have shown for example, a long and narrow still-head whereas the said still-head can be narrow at the vapor outlet and wide at the distillate inlet and function satisfactorily. In the illustrative apparatus the condenser is below the vapor inlet, other forms of apparatus are suitable, however, as long as the formaldehyde vapor contacts with relatively cool reflux and to relatively small extent. Any material might be used in building the apparatus which was not adversely affected by the products reacting or the reactants and possessed the necessary workability and strength. I therefore, do not desire to be limited in any sense to the apparatus shown and described in this application but do consider as within the scope of my invention any and all reasonable equivalents of the same.

Ordinary my invention will be applied to solutions containing less than 40% formaldehyde since 40% formaldehyde is the common commercial article of the present day. It can however also be applied to solutions of other strengths.

I claim:

1. Process of concentrating solutions of formaldehyde in less volatile liquids comprising vaporizing the solution, fractionally condensing the major part of the vapors, returning the condensate to the solution being vaporized without substantial washing or scrubbing contact with the vapors distilling from said solution, and passing the uncondensed vapors to a condenser.

2. Process of concentrating aqueous solutions of formaldehyde comprising vaporizing the solution, condensing a fraction of the vapors returning the condensate to the solution being vaporized without substantial washing or scrubbing contact with the vapors distilling from said solution, and passing the uncondensed vapors to a condenser.

3. Process of concentrating aqueous formaldehyde solutions of less than 40% formaldehyde by weight comprising vaporizing the solution, condensing a fraction of the vapors thus produced, separating the remaining vapors from the condensate as quickly as practicable and returning the condensate to the still, and separately condensing said remaining vapors.

4. Process of concentrating aqueous formaldehyde solutions of less than 40% formaldehyde by weight comprising vaporizing the solution, condensing a fraction of the vapors, returning the condensate to the solution being vaporized without substantial washing or scrubbing contact with the vapors distilling from said solution, and passing the uncondensed vapors to a condenser.

Signed at Perth Amboy in the county of Middlesex and State of New Jersey this 24th day of March, A. D. 1930.

FREDERIC WALKER.